United States Patent
Ajila et al.

(10) Patent No.: US 11,188,316 B2
(45) Date of Patent: Nov. 30, 2021

(54) PERFORMANCE OPTIMIZATION OF CLASS INSTANCE COMPARISONS

(71) Applicant: International Business Machines Corporation, Armonk, NY (US)

(72) Inventors: Oluwatobi Ajila, Ottawa (CA); Andrew James Craik, North York (CA); Daniel Heidinga, Ottawa (CA); Graham Alan Chapman, Nepean (CA)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/813,293

(22) Filed: Mar. 9, 2020

(65) Prior Publication Data

US 2021/0279044 A1 Sep. 9, 2021

(51) Int. Cl.
*G06F 8/41* (2018.01)
*G06Q 30/02* (2012.01)

(52) U.S. Cl.
CPC ............ *G06F 8/4443* (2013.01); *G06F 8/437* (2013.01); *G06Q 30/0284* (2013.01)

(58) Field of Classification Search
CPC .......................................... G06F 8/4432–4443
USPC ......................................................... 717/151
See application file for complete search history.

(56) References Cited

U.S. PATENT DOCUMENTS

| | | | |
|---|---|---|---|
| 6,370,685 B1* | 4/2002 | Robison .................. | G06F 8/433 717/141 |
| 6,848,099 B2* | 1/2005 | Harrison, III ........... | G06F 8/443 717/127 |
| 7,032,215 B2* | 4/2006 | Harrison, III ......... | G06F 8/4441 717/140 |
| 7,877,731 B2* | 1/2011 | Bekelman ................. | G06F 8/10 717/123 |
| 8,161,463 B2* | 4/2012 | Johnson .................. | H04L 9/002 717/136 |
| 8,393,003 B2* | 3/2013 | Eker ....................... | G06F 21/14 726/26 |

(Continued)

OTHER PUBLICATIONS

Marcel Gort et al.; "Range and Bitmask Analysis for Hardware Optimization in High-Level Synthesis"; Dept. of Electrical and Computer Engineering, University of Toronto Toronto, Ontario, Canada—2013, 18th Asia and South Pacific Design Automation Conference (ASP-DAC). 2013 IEEE.*

(Continued)

*Primary Examiner* — Francisco J Aponte
(74) *Attorney, Agent, or Firm* — Garg Law Firm, PLLC; Rakesh Garg; Michael O'Keefe

(57) ABSTRACT

An embodiment includes executing a code interpretation engine such that the interpretation engine interprets a first portion of a source code that includes a first comparison between a first pair of operands. The embodiment also includes performing, in memory, a first bitwise comparison between a block A1 and a block B1 of the first portion of the source code. The embodiment also speeds up execution of the first portion of the source code responsive to the first bitwise comparison producing a negative result. The embodiment speeds up the first portion by omitting at least one of (i) a second bitwise comparison between a block A2 and a block B2, and (ii) a field-wise comparison between a block A3 and a block B3.

20 Claims, 4 Drawing Sheets

(56) References Cited

U.S. PATENT DOCUMENTS

| | | | | |
|---|---|---|---|---|
| 8,407,681 | B2* | 3/2013 | Slattery | G06F 9/45516 717/158 |
| 8,418,154 | B2* | 4/2013 | McAllister | G06F 9/30018 717/140 |
| 8,458,679 | B2* | 6/2013 | Archambault | G06F 8/43 717/146 |
| 8,578,348 | B2* | 11/2013 | Fliess | G06F 11/3428 717/135 |
| 8,713,548 | B2* | 4/2014 | Chen | G06F 8/4436 717/157 |
| 8,756,616 | B2 | 6/2014 | di Flora | |
| 8,806,458 | B2* | 8/2014 | Glaister | G06F 8/453 717/146 |
| 8,918,768 | B2* | 12/2014 | Chevallier-Mames | G06F 21/14 717/140 |
| 9,176,848 | B2 | 11/2015 | Bates et al. | |
| 9,235,397 | B2* | 1/2016 | Song | G06F 8/52 |
| 9,454,470 | B2* | 9/2016 | Baudel | G06F 8/70 |
| 9,552,206 | B2* | 1/2017 | Johnson | G06F 9/30076 |
| 9,672,152 | B2 | 6/2017 | Hahnenberg | |
| 9,690,709 | B2* | 6/2017 | Sandoz | G06F 12/1458 |
| 10,732,945 | B1* | 8/2020 | Chirca | G06F 8/433 |
| 10,742,760 | B2* | 8/2020 | Burns | H04L 67/2809 |
| 2006/0070049 | A1* | 3/2006 | Chung | G06F 9/45516 717/148 |
| 2008/0163265 | A1 | 7/2008 | Flora | |
| 2010/0058477 | A1* | 3/2010 | Ciet | H04L 9/002 726/26 |
| 2012/0030451 | A1* | 2/2012 | Pong | H03M 13/096 712/223 |
| 2012/0042306 | A1* | 2/2012 | Kawahito | G06F 8/443 717/151 |
| 2014/0289503 | A1* | 9/2014 | Toll | G06F 9/30036 712/226 |
| 2015/0033211 | A1 | 1/2015 | Bates et al. | |
| 2015/0067658 | A1 | 3/2015 | Hahnenberg | |
| 2015/0169226 | A1* | 6/2015 | Shen | G06F 12/0238 711/103 |
| 2015/0268941 | A1* | 9/2015 | Nakaike | G06F 8/4443 717/152 |
| 2018/0239589 | A1* | 8/2018 | Kroener | G06F 7/575 |
| 2019/0220596 | A1 | 7/2019 | Lie et al. | |
| 2019/0243623 | A1* | 8/2019 | Rose | G06F 8/315 |
| 2019/0278576 | A1* | 9/2019 | Prokopec | G06F 8/443 |
| 2019/0369973 | A1* | 12/2019 | Ravindar | G06F 8/4434 |
| 2020/0073662 | A1* | 3/2020 | Rasale | G06F 9/30018 |
| 2020/0225921 | A1* | 7/2020 | Pelton | G06F 30/323 |
| 2020/0348916 | A1* | 11/2020 | Covaci | G06F 8/451 |

OTHER PUBLICATIONS

Mark William Stephenson; "Bitwise: Optimizing Bitwidths Using Data-Range Propagation"—Massachusetts Institute of Technology, May 5, 2000.*

Eduardo Chielle et al. "E3: A Framework for Compiling C++ Programs with Encrypted Operands"; IACR Cryptol—2018.*

Tomoharu Ugawa et al. "eJSTK: Building JavaScript virtual machines with customized datatypes for embedded systems"; Journal of Computer Languages—2019 (261-279).*

Promyk Zamojski et al. "Creating a Compiler Optimized Inlineable Implementation of Intel Svml Simd Intrinsics"; International Journal of Academic Engineering Research (IJAER) vol. 2 Issue 7, Jul. 2018, pp. 6-13.*

Valentin Bakoev; "Fast Bitwise Implementation of the Algebraic Normal Form Transform"; Serdica Journal of Computing Bulgarian Academy of Sciences Institute of Mathematics and Informatics—(2017), No. 1, 45-57.*

* cited by examiner

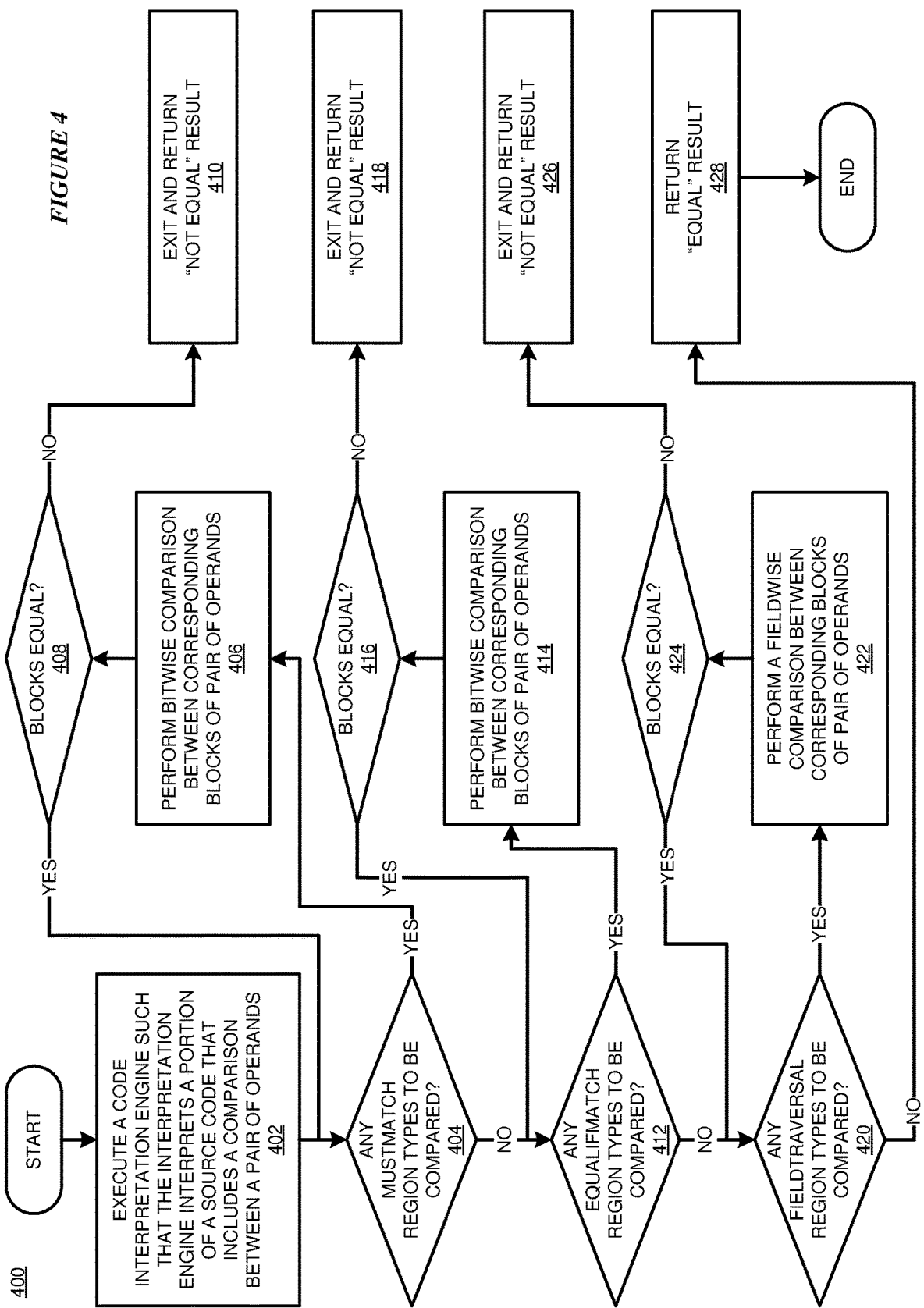

PERFORMANCE OPTIMIZATION OF CLASS INSTANCE COMPARISONS

BACKGROUND

The present invention relates generally to a method, system, and computer program product for handling class instance operations. More particularly, the present invention relates to a method, system, and computer program product for performance optimization of class instance comparisons.

Computer programs are usually written in a programming language that an experienced programmer can readily comprehend and then converted to a machine language understood by computer processors. For many programming languages, a compiler or interpreter translates the computer program into machine language. In general, a compiler will attempt to translate the entire program file at once and report errors at the end of this process, whereas an interpreter will attempt to translate the program file one line at a time and will stop when encountering an error.

For programs written using the Java programming language, the source code is typically first translated into an intermediate language called bytecode, which is then translated into machine code. The primary compiler for Java is Javac, which translates Java source code into bytecode organized in class files. A utility called a class loader then loads the bytecode into a Java Virtual Machine (JVM). A JVM includes an interpreter that translates the bytecode into machine language one line at a time. As the JVM translates each line of bytecode, the resulting machine language is provided to the computer processor for running the program.

Thus, since Java source code is first translated into bytecode before being translated into machine language, it is possible to revise or extend the functionality of Java by writing or editing bytecode. For example, a transformer in the JVM can be used to add to the instructions of a designated class method. One way to do this is to use a transformer provided with the JVM to make changes to the bytecode. For example, a transformer can be used to add functionality to a Java class method by monitoring incoming bytecodes and making the revisions to affected bytecodes as they are loaded into the JVM.

SUMMARY

The illustrative embodiments provide for performance optimization of class instance comparisons. An embodiment includes executing a code interpretation engine such that the interpretation engine interprets a first portion of a source code that includes a first comparison between a first pair of operands. The embodiment also includes performing, in memory, a first bitwise comparison between a block A1 of data and a block B1 of data from respective first data-type regions of the first pair of operands of the first portion of the source code. The embodiment also includes speeding up execution of the first portion of the source code responsive to the first bitwise comparison producing a negative result, the speeding up of the first portion comprising omitting at least one of (i) a second bitwise comparison between a block A2 of data and a block B2 of data of the first portion of the source code, and (ii) a field-wise comparison between a block A3 of data and a block B3 of data of the first portion of the source code. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts a flowchart of an example process for performing class instance comparisons in accordance with an illustrative embodiment.

DETAILED DESCRIPTION

Figure 1:
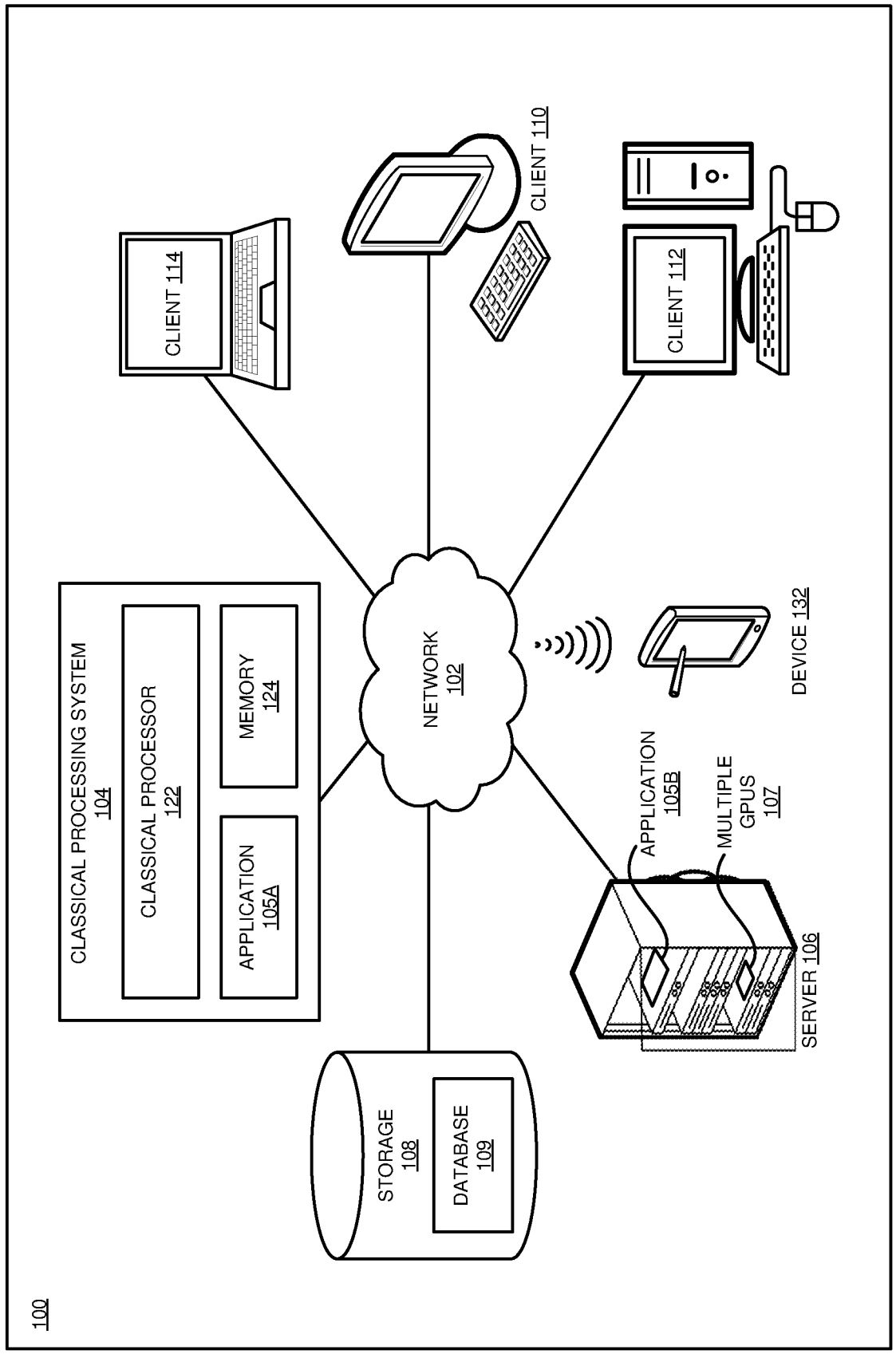
FIG. 1 depicts a block diagram of a network of data processing systems in which illustrative embodiments may be implemented.

Inline types are a new class of Java types of values. Prior to the introduction of the inline class, Java has had only two types of values: primitive types and object references. Primitive types are the most basic data types available within the Java language. There are eight kinds primitive types: boolean, byte, char, short, int, long, float and double. These types serve as the building blocks of data manipulation in Java. Such types serve one primary purpose: containing pure, simple values of a kind.

Object types offer more flexibility than primitives, but require more cache memory. Java divides memory into stack and heap memory. The stack grows and shrinks as new methods are called and returned. The heap is used for dynamic memory allocation for java objects and are classes at runtime. New objects are created in heap space and references to these objects are stored in stack memory. Each object stored the heap has a metadata header as well as the actual field content. The metadata header includes metadata that is specific to a specific object instance and a pointer to metadata that is shared with all other instances of the same class.

Inline types can be thought of as a middle ground between objects and primitives in that inline types get some of the multi-type flexibility of object classes, but are restricted by immutability and a lack of identity like primitives. In other words, inline types can be composed of multiple types, but do not have identity and are immutable. Thus, inline types offer the ability to work with compositions of multiple data types where the data utilizes memory more efficiently than objects because inline types lack the overhead used by an object header. Also, since inline types do not require such a header, inline types allow for flattening of the data; that is, inline types can be stored in a flattened representation rather than with a pointer to heap data. Inline data can be flattened within its container, which is an important optimization introduced by inline types because nowadays cache memory is expensive and the source of most bottlenecks that hinder performance improvements. Central processing units (CPUs) can perform computations very quickly, but once the cache memory is needed, performance begins to suffer. Inline types require less cache memory than object types because inline data can be stored in a more condensed format than object types, which results in performance improvements.

The illustrative embodiments recognize, however, that certain properties of inline types, such as the lack of identity, results in certain things becoming more complicated. For example, in Java, a reference comparison can be performed on two object instances to test for equality. Java uses the double-equal "==" operator for reference comparison to determine whether two references are pointing at the same memory location. A reference comparison process does not consider the two object instances equal just because they have the same values for all their fields. In Java, the comparison process also looks at memory locations, and the comparison process does not consider objects having the same values for all fields to be identical if they are stored separately in memory. The goal for inline classes, however, is to have semantics that are essentially those of primitive types. In that case the only thing that matters for equality is the bit pattern of the data, not where in memory that pattern appears.

Reference comparison processes in Java is perform comparisons using one of the two acmp instructions: acmpeq (acmp equal) or acmpne (not equal). The way the acmp instructions worked prior to the introduction of inline types is that because object classes have identity, the acmp instruction simply performed an identity comparison to verify whether the two object pointers are the same. However, since inline types lack identity, the existing acmp reference comparison will not be capable of equality tests involving inline types.

In illustrated embodiments, a reference comparison process includes structural comparisons rather than an identity comparison. Instead of doing a simple pointer comparison, a reference comparison process performs a structural comparison that includes de-referencing an object pointer, looking at every field in that structure, and comparing them with those of another operand. There are a variety of different processes that depend on the types of fields being compared, and these processes include comparison tests that vary in terms of the amount of time required to complete the comparison. The illustrated embodiments recognize that performance improvements can be realized by performing these comparisons in order from fastest to slowest because a false result to one of the faster comparisons is indicative of an overall not-equal result, so the comparison process can be exited early and the slower tests can be avoided.

According to some embodiments, a Java compiler (or interpreter) includes two paths for handling data comparisons: a standard path and a specialized path. In some embodiments, the specialized path is specific to a particular class and includes an optimized comparison path for that class. For example, in some embodiments, a user can implement a specialized path for a particular class where the user recognizes that the class in question will be subject to frequent comparison tests.

The compiling process for Java typically involves a first stage (static compilation) performed by a compiler, such as Javac, that translates the Java source code into bytecode, and a second stage that is performed by an interpreter, such as a JVM interpreter, that emulates the JVM bytecodes for the specific CPU being executed on. The second stage can also be performed by the JIT (Just in time-dynamic compiler) that translates the bytecode into machine code. While interpreters and compilers have similarities and differences, for the sake of simplicity compilers and interpreters will be referred to herein as "compilers" with the understanding that references to a "compiler" herein apply equally to a compiler and an interpreter.

According to some embodiments, a compiler includes a structural comparison path for handling structural data comparisons by iterating through the data in each field and performing data comparisons in an order that accounts for how quickly each data type can be performed. In some embodiments, the comparison path compares data types that can be compared relatively quickly before comparing other data types that take longer to compare. Thus, in some embodiments, a compiler performs data comparisons in an order based on how quickly the comparisons can be performed, with relatively faster comparisons first before relatively slower comparisons.

In some embodiments, a compiler includes field layouts for classes that place data types in an order based on how quickly the comparisons can be performed, with data types associated with relatively faster comparisons before data types associated with relatively slower comparisons. Thus, in some embodiments, the field layout for classes are enhanced to coincide with a comparison path that performs comparisons of data types in an order based on how quickly the comparisons can be performed, with relatively faster comparisons first before relatively slower comparisons. For example, in some embodiments, the instance field layouts for classes place data types in the order shown in Table 1 below. Also, in some embodiments, a reference comparison process performs data comparisons in the order shown in Table 1 below. Thus, in some embodiments, a reference comparison process performs data comparisons in the order in which they occur after the object header.

TABLE 1

| Object header | |
| --- | --- |
| Offset 0 | |
| 1. Non-floating point primitives | MustMatch region |
| 2. References that cannot refer to inline types | |
| 3. Flattened types eligible for bitwise comparison | |
| MustMatch offset 1 | |
| 4. References that may refer to inline types | EqualIfMatch region |
| MustMatch offset 2 | |
| 5. References that always refer to inline types | |
| EqualIfMatch offset | |
| 6. Floating point primitives | FieldTraversal region |
| 7. Flattened types not eligible for bitwise comparison | |
| EndObject offset | |

In illustrative embodiments, a compiler includes field layouts for classes that place any non-floating type primitive fields at the top (offset=0 from the class header) followed by any reference fields that are statically known, or known at class load time, to not contain inline types (e.g., array references and references that have already been loaded and are known to not be interfaces). In some embodiments, the next fields will contain any flattened types that are eligible for bitwise comparison functions, such as memcmp( ). In some embodiments, the next fields will contain any references that may refer to inline types (java.lang.Object, interfaces), followed by any references that always refer to inline types. In some embodiments, the next fields will be floating point primitive fields, followed by flattened fields that are not eligible for memcmp, such as references that require a recursive call to perform the comparison.

The term "offset" as used herein refers to an amount of computer memory. Thus, in Table 1, data at Offset 0 immediately follows the object header in memory. MustMatch offset 1 will be equal to the amount of memory used by data, if any, in the MustMatch region. MustMatch offset 2 will be equal to the sum of MustMatch offset 1 and the amount of memory used by references, if any, that always refer to inline types. EqualIfMatch offset will be equal to the sum of MustMatch offset 1 and the amount of memory used by data, if any, in the EqualIfMatch region. EndObject offset will be equal to the sum of EqualIfMatch offset and the amount of memory used by data, if any, in the FieldTraversal region.

In illustrative embodiments, a compiler includes instance field layouts for classes that include three regions that correspond to respective types of comparison tests used for data types in the corresponding region. In some embodiments, the first region is a 'MustMatch region' of data types that are eligible for bitwise comparison. In some embodiments, a reference comparison process first performs a bitwise comparison on data in the MustMatch region. If the match fails, the reference comparison process concludes that the two objects are not equal, and that no other checks are required. If the match succeeds (i.e., determines that the data is bitwise identical) and there are no other regions in the object, then the reference comparison process concludes that the two objects are equal.

In some embodiments, the second region is an EqualIfMatch region of data types that are eligible for bitwise comparison, but require bitwise comparison between all data by the reference comparison process before the process can conclude that the objects are or are not equal. In some embodiments, if a reference comparison process performs bitwise comparisons of data in the MustMatch region that succeed and there are more regions in the EqualIfMatch region, the reference comparison process performs a bitwise comparison on data in the EqualIfMatch region. If the reference comparison process determines that the bitwise comparisons of data in the EqualIfMatch region succeed, then the reference comparison process concludes that the two objects are equal (if there are no other regions in the object).

In some embodiments, the third region is a FieldTraversal region of data types that are not eligible for bitwise comparison, but require a field-wise or recursive comparison. In some embodiments, if a reference comparison process performs bitwise comparisons of data in the MustMatch region and/or in the EqualIfMatch region that all succeed, and there is data in the FieldTraversal region, the reference comparison process next checks the data in the FieldTraversal region. In some embodiments, the reference comparison process performs a field-wise comparison on each field in the FieldTraversal region. In some embodiments, the reference comparison process also determines whether the data includes recursive types, and if so, performs a recursive comparison on the recursive-type data. If the reference comparison process determines that all fields are match, then the reference comparison process concludes that the two objects are equal, otherwise the reference comparison process concludes that they are not equal.

In some embodiments, if a compiler knows statically that a type only contains data in the MustMatch region, the compiler sets a "fast comparison flag" to a TRUE state in the class metadata. In some embodiments, a reference comparison process determines if the state of the "fast comparison flag" is in the TRUE state, and if so, the reference comparison process performs only bitwise comparisons of the data.

In some embodiments, as an additional speculative optimization in cases where equality is expected, a reference comparison process performs a bitwise comparison on the MustMatch and EqualIfMatch region. If the comparison succeeds and the only data types are data types in the MustMatch and/or EqualIfMatch regions, then the reference comparison process concludes that the two objects are equal. If there are more regions or the comparison fails, then the reference comparison process performs field-wise comparison between the data in the FieldTraversal region in order to reach a conclusion.

In illustrative embodiments, a compiler includes field layouts that place data types in the order shown in Table 1 where the data types are as follows:

1. Non-floating point primitives: the easiest things to compare are the primitive fields because a reference comparison process simply performs a bitwise comparison (as long as the primitives are not floating point fields).
2. References that cannot refer to inline types: these data types include references that do not refer to inline types and are statically known to never refer to inline types, and a reference comparison process only performs a bitwise comparison on these.
3. Flattened types eligible for bitwise comparison: these data types include any flattened type that only contains non-floating points, and a reference comparison process only performs a bitwise comparison on these.
4. References that may refer to inline types: for this data, a reference comparison process uses runtime information to determine if the reference could have referred to an inline type or not and treat data in this category as data that might refer to an inline type or might not. If data in this category ever does refer to an inline type, this can be recorded with the data so that a reference comparison process can detect if it has ever referred to an inline type or never referred to an inline type. If the reference comparison process detects that it has never referred to an inline type, then the reference comparison process can perform a bitwise comparison on the data.
5. References that always refer to inline types: these data types always refer to inline types, so a reference comparison process will have to perform a recursive comparison, which is slower than bitwise comparisons.
6. Floating point primitives: a reference comparison process compares floating points using a special floating Point field-wise comparison that is slower than the comparisons used for data types 1-5. A bitwise comparison is faster than doing a field-wise (field by field) comparison because, for the field by field comparison, a reference comparison process actually has to determine the offset of each field and then compare each field. For a bitwise comparison, a reference comparison process determines the start and size of each operand and compares this information and the comparison done. Many processors have instructions that can do this type of bitwise comparison very quickly, so bitwise comparisons are a much faster test than field-wise comparisons.
7. Flattened types not eligible for bitwise comparison: these flattened types probably contain floating points or contain recursive types, so a reference comparison process will perform recursive or floating point field-wise comparisons that are slower than bitwise comparisons.

In some embodiments, a compiler orders the fields in the FieldTraversal region such that the fields most likely to be unequal are placed before the fields likely to be equal so that the specialized routine can fail fast. Profiling data from a previous run indicating the frequency of inequality in comparison between fields of a given type can be stored in memory. At field layout assignment time (during class load) this data can be used to order the fields. In some embodiments, a compiler places the fields in an order based on a likelihood to fail. In such embodiments, instead of a sequential traversal, fields are traversed based on their likelihood to fail. In some such embodiments, a compiler uses profiling data from a previous run and/or a current run to determine the field comparison order.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
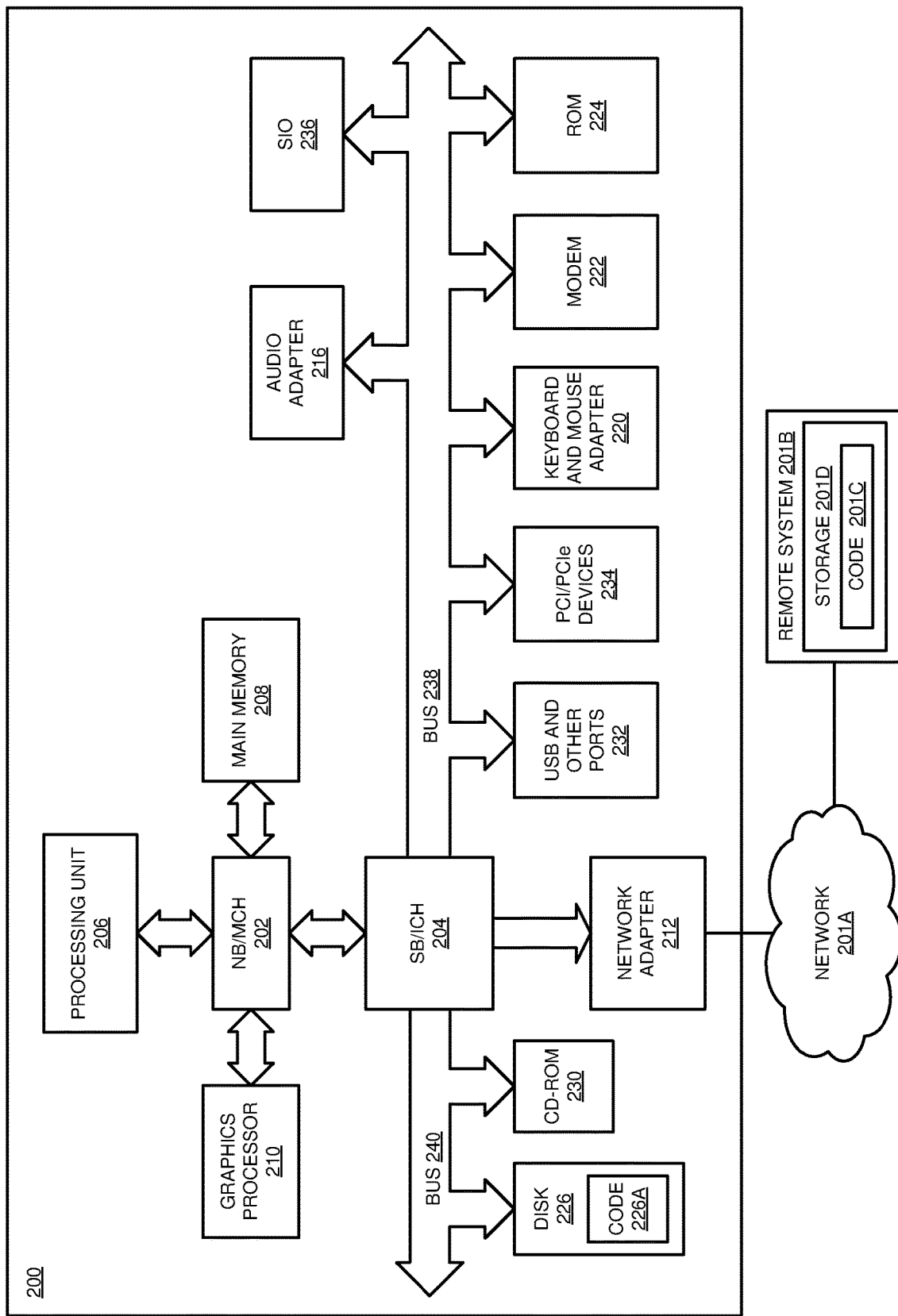
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data.

Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown. In an embodiment, server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
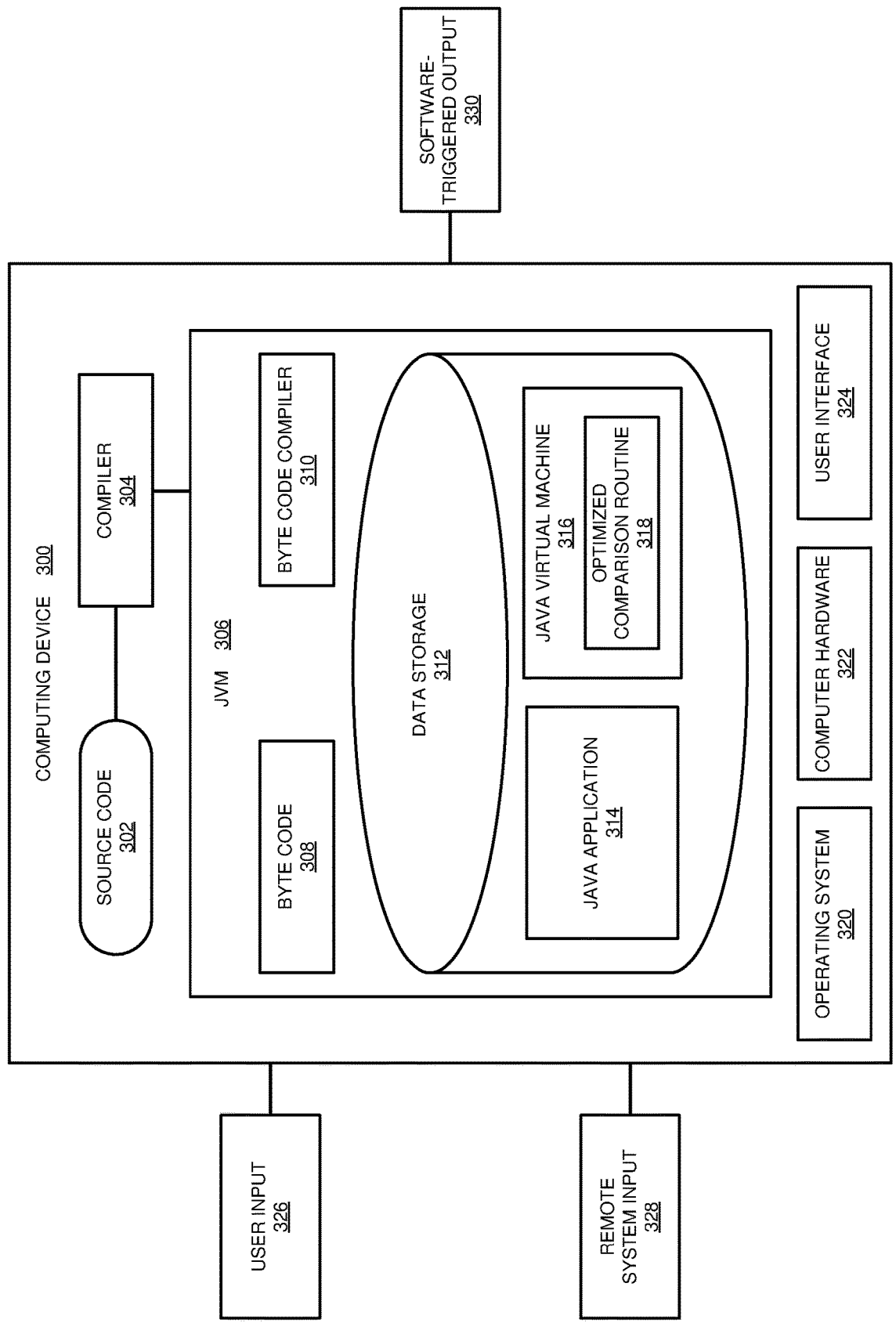
FIG. 3 depicts a block diagram of an example computing device for performing class instance comparisons in accordance with an illustrative embodiment.

With reference to FIG. 3, this figure depicts a block diagram of an example computing device 300 for performing class instance comparisons in accordance with an illustrative embodiment. The example embodiment includes a Java virtual machine 316 that includes an optimized comparison routine 318 that performs class instance comparisons in accordance with an illustrative embodiment. In some embodiments, optimized comparison routine 318 is an example of application 105A/105B of FIG. 1. In some embodiments, optimized comparison routine 318 performs class instance comparisons according to the flowchart shown in FIG. 4.

In some embodiments, the computing device 300 includes a compiler 304 that receives source code 302 and translates it into bytecode 308, and a JVM 306 that includes a bytecode compiler 310 that receives the bytecode 308 and translates it into a Java application 314 using a Java virtual machine 316. The JVM 306 also includes data storage 312 for storing the application 314 and Java virtual machine 316. In the illustrated embodiment, the Java virtual machine 316 includes an optimized comparison routine 318. The computing device 300 also includes an operating system 320 running on computer hardware 322 and providing an operating environment for the Java application 314. The computing system 300 also includes a user interface 324 responsive to user input 326 and remote system input 328. In some embodiments, the computing device 300 outputs software-triggered output 300, including outputs triggered by the comparison routine 318 of the Java application 314.

With reference to FIG. 4, this figure depicts a flowchart of an example process 400 for performing class instance comparisons in accordance with an illustrative embodiment. In a particular embodiment, the computing device 300 carries out the process 400 using the comparison routine 318.

In an embodiment, at block 402, the process executes a code interpretation engine such that the interpretation engine interprets a portion of a source code that includes a comparison between a pair of operands. For example, in some embodiments, the process receives a request in an interpreter or compiler to interpret a portion of source code and executes the code interpretation engine in response to the request. Next, at block 404, the process determines whether the operands include any data types in the MustMatch region. If so, the process continues to block 406, where the process performs a bitwise comparison between corresponding blocks of the pair of operands. Next, at block 408, the process checks the results of the comparison. If the comparison returns a negative result, then at block 410 the process exits and returns a "not equal" result. Otherwise, the process returns to block 404.

If the process at block 404 determines that there are no further data types in the MustMatch region, the process continues to block 412. At block 412, the process determines whether the operands include any data types in the EqualIfMatch region. If so, the process continues to block 414, where the process performs a bitwise comparison between corresponding blocks of the pair of operands. Next, at block 416, the process checks the results of the comparison. If the comparison returns a negative result, then at block 418 the process exits and returns a "not equal" result. Otherwise, the process returns to block 412.

If the process at block 412 determines that there are no further data types in the EqualIfMatch region, the process continues to block 420. At block 420, the process determines whether the operands include any data types in the Field-Traversal region. If so, the process continues to block 422, where the process performs a field-wise comparison between corresponding blocks of the pair of operands. Next, at block 424, the process checks the results of the comparison. If the comparison returns a negative result, then at block 426 the process exits and returns a "not equal" result. Otherwise, the process returns to block 420.

If the process at block 420 determines that there are no further data types in the fieldTraversal region, the process continues to block 428. At block 428, the process returns an "equal" result and the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
   executing a code interpretation engine such that the interpretation engine interprets a first portion of a source code that includes a first comparison between a first pair of operands, the first pair of operands comprising respective first data-type regions and respective second data-type regions;
   performing, in memory, a first bitwise comparison between a block A1 of data and a block B1 of data from the respective first data-type regions of the first pair of operands of the first portion of the source code; and
   speeding up execution of the first portion of the source code responsive to the first bitwise comparison producing a negative result, the speeding up of the first portion comprising omitting comparison of the respective second data-type regions of the first pair of operands by omitting at least one of (i) a second bitwise comparison between a block A2 of data and a block B2 of data of the first portion of the source code, and (ii) a field-wise comparison between a block A3 of data and a block B3 of data of the first portion of the source code.

2. The computer implemented method of claim 1, further comprising:
   performing, in memory for a second portion of the source code that includes a second comparison between a second pair of operands, responsive to the first bitwise comparison producing a positive result from the first bitwise comparison between a block C1 of data and a block D1 of data from respective first data-type regions of the second pair of operands of the second portion, and a second bitwise comparison on a block C2 of data and a block D2 of data from respective second data-type regions of the second pair of operands of the second portion; and
   speeding up execution of the second portion of the source code responsive to the second bitwise comparison producing a positive result, the speeding up of the second portion comprising omitting a field-wise comparison between a block C3 of data and a block D3 of data of the second portion.

3. The computer implemented method of claim 2, further comprising:
   performing, in memory for a third portion of the source code that includes a third comparison between a third pair of operands, responsive to the first bitwise comparison producing a positive result from the first bitwise comparison between a block E1 of data and a block F1 of data from respective first data-type regions of the third pair of operands of the third portion, and a second bitwise comparison on a block E2 of data and a block F2 of data from respective second data-type regions of the third pair of operands of the third portion;
   performing, in memory for the third portion of the source code, responsive to the second bitwise comparison producing a positive result, a field-wise comparison between a block E3 of data and a block F3 of data from respective third data-type regions of the third pair of operands of the third portion; and
   writing a value to memory representative of a comparison result of the comparison between the third pair of operands.

4. The computer implemented method of claim 3, further comprising performing, in memory, a recursive comparison between a block E4 of data and a block F4 of data of the third portion of the source code, wherein the block E4 and the block F4 include a recursive data type.

5. The computer implemented method of claim 4, wherein the comparison result of the third pair of operands is based at least in part on the first bitwise comparison between the block E1 and the block F1, the second bitwise comparison between the block E2 and the block F2, the field-wise comparison between block E3 and F3, and the recursive comparison between the block E4 and the block F4.

6. The computer implemented method of claim 3, further comprising performing, in memory, a floating-point comparison between a block E4 of data and a block F4 of data of the third portion of the source code, wherein the block E4 and the block F4 include a floating-point data type.

7. The computer implemented method of claim 6, wherein the comparison result of the third pair of operands is based at least in part on the first bitwise comparison between the block E1 and the block F1, the second bitwise comparison between the block E2 and the block F2, the field-wise comparison between block E3 and F3, and the floating point comparison between the block E4 and the block F4.

8. The computer implemented method of claim 1, wherein the block A1 and the block B1 include a primitive data type.

9. The computer implemented method of claim 4, wherein the block A2 and the block B2 include a reference that refers to an inline data type.

10. The computer implemented method of claim 5, wherein the block A3 and the block B3 include a floating-point data type.

11. The computer implemented method of claim 1, wherein the first pair of operands include respective headers, and wherein the block A1 and the block B1 are at a first offset from the headers, and wherein the block A2 and the block B2 are at a second offset from the headers, wherein the second offset is greater than the first offset.

12. The computer implemented method of claim 11, wherein the block A3 and the block B3 are at third offsets from the headers, the third offset being greater than the second offset.

13. A computer usable program product for performing class instance comparisons, the computer program product comprising a computer readable storage medium having program instructions embodied therewith, the program instructions executable by a processor to cause the processor to perform operations comprising:
   executing a code interpretation engine such that the interpretation engine interprets a first portion of a source code that includes a first comparison between a first pair of operands, the first pair of operands comprising respective first data-type regions and respective second data-type regions;
   performing, in memory, a first bitwise comparison between a block A1 of data and a block B1 of data from the respective first data-type regions of the first pair of operands of the first portion of the source code; and
   speeding up execution of the first portion of the source code responsive to the first bitwise comparison producing a negative result, the speeding up of the first portion comprising omitting comparison of the respective second data-type regions of the first pair of operands by omitting at least one of (i) a second bitwise comparison between a block A2 of data and a block B2 of data of the first portion of the source code, and (ii) a field-wise comparison between a block A3 of data and a block B3 of data of the first portion of the source code.

14. The computer usable program product of claim 13, wherein the stored program instructions are stored in a computer readable storage device in a data processing system, and wherein the stored program instructions are transferred over a network from a remote data processing system.

15. The computer usable program product of claim 13, wherein the stored program instructions are stored in a computer readable storage device in a server data processing system, and wherein the stored program instructions are downloaded over a network to a remote data processing system for use in a computer readable storage device associated with the remote data processing system, further comprising:
   program instructions to meter use of the computer usable code associated with a request; and
   program instructions to generate an invoice based on the metered use.

16. A computer usable program product of claim 13, further comprising:
   performing, in memory for a second portion of the source code that includes a second comparison between a second pair of operands, responsive to the first bitwise comparison producing a positive result from the first bitwise comparison between a block C1 of data and a block D1 of data from respective first data-type regions of the second pair of operands of the second portion, and a second bitwise comparison on a block C2 of data and a block D2 of data from respective second data-type regions of the second pair of operands of the second portion; and
   speeding up execution of the second portion of the source code responsive to the second bitwise comparison producing a positive result, the speeding up of the second portion comprising omitting a field-wise comparison between a block C3 of data and a block D3 of data of the second portion.

17. A computer usable program product of claim 16, further comprising:
   performing, in memory for a third portion of the source code that includes a third comparison between a third pair of operands, responsive to the first bitwise comparison producing a positive result from the first bitwise comparison between a block E1 of data and a block F1 of data from respective first data-type regions of the third pair of operands of the third portion, and a second bitwise comparison on a block E2 of data and a block F2 of data from respective second data-type regions of the third pair of operands of the third portion;
   performing, in memory for the third portion of the source code, responsive to the second bitwise comparison producing a positive result, a field-wise comparison between a block E3 of data and a block F3 of data from respective third data-type regions of the third pair of operands of the third portion; and
   writing a value to memory representative of a comparison result of the comparison between the third pair of operands.

18. A computer system comprising a processor and one or more computer readable storage media, and program instructions collectively stored on the one or more computer readable storage media, the program instructions executable by the processor to cause the processor to perform operations comprising:
   executing a code interpretation engine such that the interpretation engine interprets a first portion of a source code that includes a first comparison between a first pair of operands, the first pair of operands comprising respective first data-type regions and respective second data-type regions;
   performing, in memory, a first bitwise comparison between a block A1 of data and a block B1 of data from the respective first data-type regions of the first pair of operands of the first portion of the source code; and
   speeding up execution of the first portion of the source code responsive to the first bitwise comparison producing a negative result, the speeding up of the first portion comprising omitting comparison of the respective second data-type regions of the first pair of operands by omitting at least one of (i) a second bitwise comparison between a block A2 of data and a block B2 of data of the first portion of the source code, and (ii) a field-wise comparison between a block A3 of data and a block B3 of data of the first portion of the source code.

19. The computer system of claim 18, further comprising:
   performing, in memory for a second portion of the source code that includes a second comparison between a second pair of operands, responsive to the first bitwise comparison producing a positive result from the first bitwise comparison between a block C1 of data and a block D1 of data from respective first data-type regions of the second pair of operands of the second portion, and a second bitwise comparison on a block C2 of data and a block D2 of data from respective second data-type regions of the second pair of operands of the second portion; and
   speeding up execution of the second portion of the source code responsive to the second bitwise comparison producing a positive result, the speeding up of the second portion comprising omitting a field-wise comparison between a block C3 of data and a block D3 of data of the second portion.

20. The computer system of claim 19, further comprising:
   performing, in memory for a third portion of the source code that includes a third comparison between a third pair of operands, responsive to the first bitwise comparison producing a positive result from the first bitwise comparison between a block E1 of data and a block F1 of data from respective first data-type regions of the third pair of operands of the third portion, and a second bitwise comparison on a block E2 of data and a block F2 of data from respective second data-type regions of the third pair of operands of the third portion;
   performing, in memory for the third portion of the source code, responsive to the second bitwise comparison producing a positive result, a field-wise comparison between a block E3 of data and a block F3 of data from respective third data-type regions of the third pair of operands of the third portion; and
   writing a value to memory representative of a comparison result of the comparison between the third pair of operands.

* * * * *